US012384462B2

(12) United States Patent
Honda

(10) Patent No.: US 12,384,462 B2
(45) Date of Patent: Aug. 12, 2025

(54) VEHICLE DRIVING SUPPORT DEVICE

(71) Applicant: TOYOTA JIDOSHA KABUSHIKI KAISHA, Toyota (JP)

(72) Inventor: Masaaki Honda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 17/413,000

(22) Filed: Aug. 26, 2021

(65) Prior Publication Data

US 2022/0153347 A1 May 19, 2022

(30) Foreign Application Priority Data

Nov. 19, 2020 (JP) .................................. 2020-192328

(51) Int. Cl.
*B60W 40/072* (2012.01)
*B60W 50/14* (2020.01)
*B62D 15/02* (2006.01)

(52) U.S. Cl.
CPC ......... *B62D 15/029* (2013.01); *B60W 40/072* (2013.01); *B60W 50/14* (2013.01)

(58) Field of Classification Search
CPC ........... B60W 40/072; B60W 2552/30; B60W 50/14; B60W 50/16; B60W 2050/143; B60W 2050/146; B60W 40/076; B60W 30/0953; B60W 30/143; B60W 2420/403; B60W 2420/408; B60W 2552/20; B62D 15/029; B62D 15/021; B60T 2210/24; B60T 8/1755; B60K 31/0066

See application file for complete search history.

(56) References Cited

U.S. PATENT DOCUMENTS

| 10,227,039 B1* | 3/2019 | Prasad .................. B60W 50/14 |
| 2002/0041229 A1 | 4/2002 | Satoh et al. |
| 2005/0096828 A1* | 5/2005 | Uemura .............. B60T 8/17557 |
| | | 701/1 |
| 2013/0274996 A1* | 10/2013 | Sekine .................... G06F 17/00 |
| | | 701/36 |

(Continued)

FOREIGN PATENT DOCUMENTS

| CN | 104742909 A | 7/2015 |
| CN | 108275157 A | 7/2018 |

(Continued)

*Primary Examiner* — Khoi H Tran
*Assistant Examiner* — Tanner L Cullen
(74) *Attorney, Agent, or Firm* — Sughrue Mion, PLLC

(57) ABSTRACT

A vehicle driving support device issues an alert to notify a driver of a vehicle in advance that the vehicle is approaching a road having a large curvature. The vehicle driving support device includes a forward information providing device that provides forward information that is information forward of the vehicle, acquires, from the forward information, a curvature of a point that is a first distance forward from the vehicle and a curvature of a point that is a second distance forward from the vehicle, as a near point curvature and a distant point curvature, respectively, the second distance being longer than the first distance, and the curvatures being curvatures of a road on which the vehicle is traveling, and issues the alert when an alert condition is satisfied that the distant point curvature is larger than the near point curvature by a predetermined value or more.

9 Claims, 5 Drawing Sheets

(56) References Cited

U.S. PATENT DOCUMENTS

| | | | | |
|---|---|---|---|---|
| 2014/0188383 | A1* | 7/2014 | Denaro | G06F 16/29 |
| | | | | 701/461 |
| 2015/0175166 | A1* | 6/2015 | Sakima | B60W 40/072 |
| | | | | 702/157 |
| 2015/0175167 | A1 | 6/2015 | Sakima et al. | |
| 2017/0270373 | A1* | 9/2017 | Kawasaki | G06T 7/60 |
| 2020/0108837 | A1* | 4/2020 | Kim | B60W 30/045 |
| 2020/0148224 | A1* | 5/2020 | Kim | B60W 50/0097 |
| 2020/0398856 | A1* | 12/2020 | Giurgiu | B60W 40/072 |

FOREIGN PATENT DOCUMENTS

| | | | | |
|---|---|---|---|---|
| JP | 8-194888 A | | 7/1996 | |
| JP | 2002-079895 A | | 3/2002 | |
| JP | 2016-9247 A | | 1/2016 | |
| JP | 2016009247 A | * | 1/2016 | B60R 21/00 |
| JP | 2017107502 A | * | 6/2017 | B60R 16/02 |
| JP | 2018020635 A | * | 2/2018 | B60W 30/12 |

* cited by examiner

VEHICLE DRIVING SUPPORT DEVICE

CROSS-REFERENCE TO RELATED APPLICATION

This application claims priority to Japanese Patent No. 2020-192328 filed on Nov. 19, 2020, incorporated herein by reference in its entirety.

BACKGROUND

1. Technical Field

The present disclosure relates to a vehicle driving support device.

2. Description of Related Art

A vehicle driving support device is known that issues an alert to notify a driver of a vehicle that the vehicle cannot travel along the lane. As the vehicle driving support device mentioned above, a vehicle driving support device is also known (see Japanese Unexamined Patent Application Publication No. 2002-79895 (JP 2002-79895 A), for example). The vehicle driving support device acquires by calculation the yaw rate of the vehicle required to be generated (required yaw rate) at that moment in order for the vehicle to reach the center point of the lane that is a predetermined distance forward of the vehicle. When a deviation of the current actual yaw rate from the required yaw rate is large, the vehicle driving support device determines that the vehicle cannot travel along the lane and issues an alert.

SUMMARY

The related-art vehicle driving support device mentioned above uses information on a point that is located a predetermined distance forward of the vehicle (required yaw rate) to determine whether to issue an alert. Therefore, for example, in order to notify the driver that the vehicle is approaching a sharp curved road in a case where there is the sharp curved road (road with a large curvature) ahead of a straight road, the predetermined distance may be set to a relatively long distance so that the information on the point of the sharp curved road (required yaw rate) is used for determining whether to issue an alert while the vehicle is traveling on the straight road.

However, if the predetermined distance is set to a too long distance, the following inconveniences may occur. The related-art vehicle driving support device uses the current actual yaw rate to determine whether to issue an alert. Accordingly, the alert issued by the related-art vehicle driving support device is an alert for the driver's current steering wheel operation in anticipation of the yaw rate that will be required in the future. Thus, for the driver, the alert issued by the related-art vehicle driving support device is an alert only for the driver's current steering wheel operation. Therefore, if the predetermined distance is set to a too long distance, an alert is issued for the driver's current steering wheel operation based on the steering wheel operation that will be required in the distant future. In other words, even though the vehicle is long away from reaching the sharp curved road, an alert is issued for the driver's current steering wheel operation. This can give the driver a sense of discomfort. Of course, by setting the predetermined distance to a short distance, such a situation can be suppressed, but in that case, the alert is issued only when the vehicle approaches a sharp curved road, and it may be too late as an alert to the driver.

An object of the present disclosure is to provide a vehicle driving support device capable of notifying a driver in advance and without discomfort that a vehicle is approaching a road having a large curvature.

A vehicle driving support device includes a control unit that issues an alert to notify a driver of a vehicle in advance that the vehicle is approaching a road having a large curvature. Further, the vehicle driving support device according to the present disclosure includes a forward information providing device that provides forward information that is information forward of the vehicle. The control unit is configured to: acquire, from the forward information, a curvature of a point that is a first distance forward from the vehicle and a curvature of a point that is a second distance forward from the vehicle, as a near point curvature and a distant point curvature, respectively, the second distance being longer than the first distance, and the curvatures being curvatures of a road on which the vehicle is traveling; and issue the alert when an alert condition is satisfied that the distant point curvature is larger than the near point curvature by a predetermined value or more.

The vehicle driving support device according to the present disclosure uses the curvature of the road at the point that is the first distance ahead of the point where the vehicle is currently traveling (near point curvature) and the curvature of the road at the point that is the second distance ahead of the point where the vehicle is currently traveling (distant point curvature), rather than the curvature of the road at the point where the vehicle is currently traveling, in order to determine whether to issue an alert. Therefore, for the driver, the alert is not for the driver's current steering wheel operation, but for the steering wheel operation required in the future. Thus, it is possible to notify the driver in advance and without discomfort that the vehicle is approaching a road having a large curvature.

In the vehicle driving support device according to the present disclosure, the control unit may be configured to set a level of the alert to be lower when a steering wheel operation by the driver is detected than when the steering wheel operation by the driver is not detected.

For example, when the driver is operating the steering wheel by themselves when the alert condition is satisfied, the driver must steer the vehicle by themselves such that the vehicle travels along the lane when the vehicle approaches a sharp curved road. In this case, issuing an alert may make the driver feel annoyed. In contrast, if the driver is not operating the steering wheel while looking aside, taking a nap, or taking their hands off the steering wheel, the alert is useful to the driver.

The vehicle driving support device according to the present disclosure sets the alert level to be lower when the steering wheel operation by the driver is detected than when the steering wheel operation by the driver is not detected. Thus, when the alert may make the driver feel annoyed, a low level alert is issued, and when issuing the alert is useful for the driver, a high level alert is issued. Therefore, it is possible to issue a useful alert while suppressing making the driver feel annoyed.

The alert condition may include a condition that a steering wheel operation by the driver is not detected. With this, when the steering wheel operation by the driver is detected, the alert is not issued. Thus, it is possible to issue an alert while suppressing making the driver feel annoyed.

Also, the alert condition may include a condition that the distant point curvature is equal to or larger than a predetermined distant point curvature. With this, the alert can be issued only when the distant point curvature is large and the need for the alert is high.

Also, the alert condition may include a condition that the near point curvature is equal to or larger than a predetermined near point curvature. With this, the alert can be issued only when the near point curvature is large and the need for the alert is high.

The constituent elements of the present disclosure are not limited to the embodiment of the present disclosure described later with reference to the drawings. Other objects, other features and accompanying advantages of the present disclosure will be readily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram showing a road on which the vehicle equipped with the vehicle driving support device according to the embodiment of the present disclosure travels, and the like;

DETAILED DESCRIPTION OF EMBODIMENTS

Figure 1:
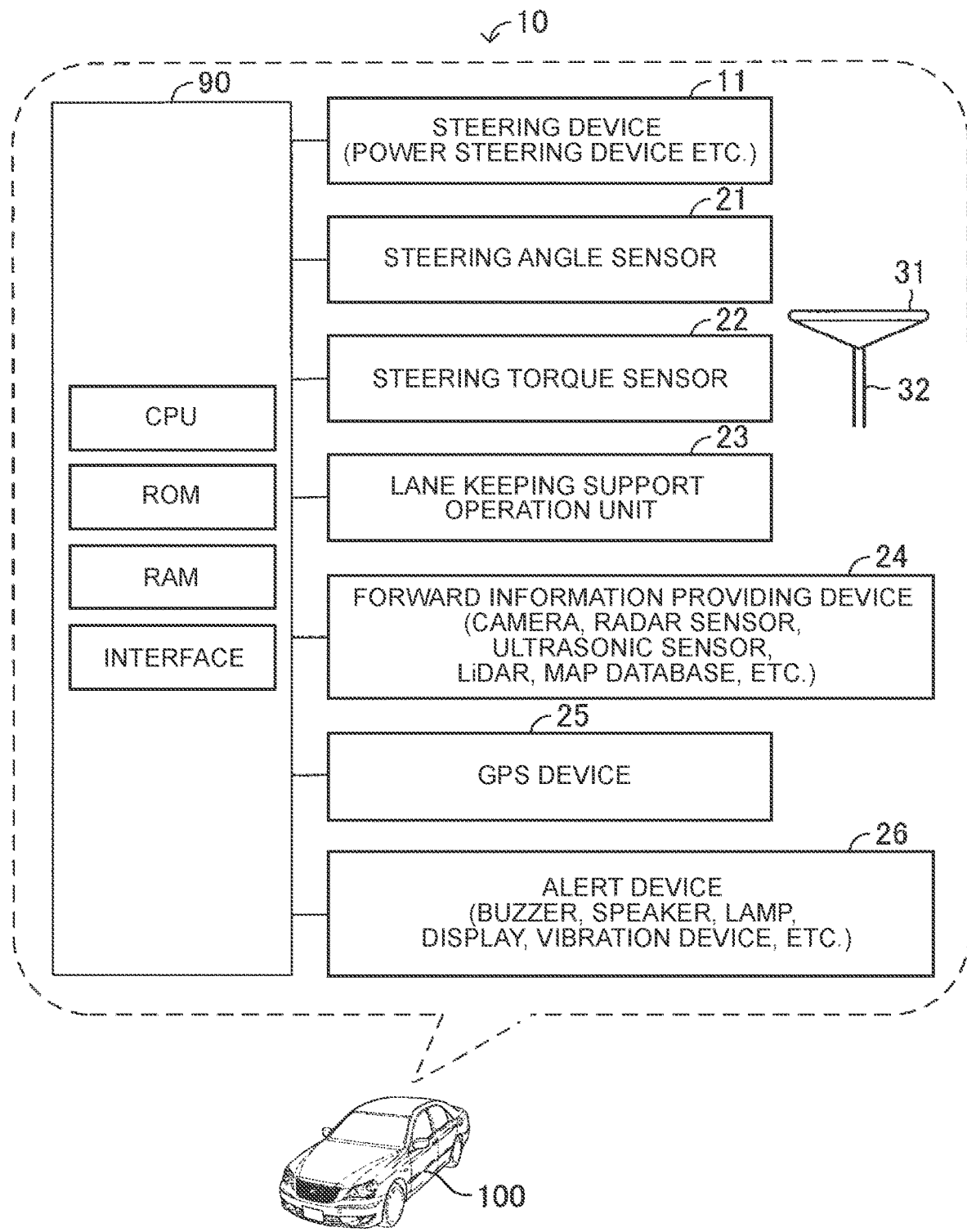
FIG. 1 is a diagram showing a vehicle driving support device according to an embodiment of the present disclosure and a vehicle equipped with the vehicle driving support device.

Hereinafter, a vehicle driving support device according to an embodiment of the present disclosure will be described with reference to the drawings. FIG. 1 shows a vehicle driving support device 10 according to the embodiment of the present disclosure and a vehicle 100 equipped with the vehicle driving support device 10.

ECU

The vehicle driving support device 10 includes an electronic control unit (ECU) 90. The ECU is an abbreviation for electronic control unit. The ECU 90 includes a microcomputer as a main component. The microcomputer includes a central processing unit (CPU), a read only memory (ROM), a random access memory (RAM), a non-volatile memory, an interface, and the like. The CPU realizes various functions by executing instructions, programs, or routines stored in the ROM.

Forward Information Providing Device, etc.

The vehicle 100 is equipped with a steering device 11, a steering angle sensor 21, a steering torque sensor 22, a lane keeping support operation unit 23, a forward information providing device 24, a Global Positioning System (GPS) device 25, and an alert device 26.

Steering Device

The steering device 11 is a device that outputs a steering force (steering torque) applied to the vehicle 100 to steer the vehicle 100, and is, for example, a power steering device. The steering device 11 is electrically connected to the ECU 90. The ECU 90 can control the steering force output from the steering device 11 by controlling the operation of the steering device 11.

Steering Angle Sensor and Steering Torque Sensor

The steering angle sensor 21 is a sensor that detects a rotation angle of a steering wheel 31 (or a steering shaft 32) with respect to the neutral position. The steering angle sensor 21 is electrically connected to the ECU 90. The steering angle sensor 21 transmits information on the detected rotation angle of the steering wheel 31 to the ECU 90. The ECU 90 acquires the rotation angle of the steering wheel 31 as a steering angle θ based on the information.

The steering torque sensor 22 is a sensor that detects the torque input to the steering shaft 32 via the steering wheel 31. The steering torque sensor 22 is electrically connected to the ECU 90. The steering torque sensor 22 transmits information of the detected torque to the ECU 90. Based on the information, the ECU 90 acquires the torque input to the steering shaft 32 via the steering wheel 31 as a steering torque TQ.

The ECU 90 acquires by calculation a required steering force (required steering torque) from the steering angle θ and the steering torque TQ. Alternatively, the ECU 90 corrects the calculated required steering force as necessary to acquire a corrected required steering force while a lane keeping support control described later is being executed. The required steering force and the corrected required steering force are steering forces for which output is required of the steering device 11. The ECU 90 controls the operation of the steering device 11 so that the required steering force or the corrected required steering force is output. Further, the ECU 90 can determine whether the operation of the steering wheel 31 by the driver is being performed, from the steering angle θ, the steering torque TQ, and the like.

Lane Keeping Support Operation Unit

The lane keeping support operation unit 23 is a device operated by the driver of the vehicle 100 in order to request the execution of the lane keeping support control described later as the vehicle driving support control, and has at least one of a button, a switch, and the like, for example. The lane keeping support operation unit 23 is electrically connected to the ECU 90. When a predetermined operation requesting execution of the lane keeping support control is performed, the lane keeping support operation unit 23 transmits a signal corresponding to the predetermined operation to the ECU 90. When the ECU 90 receives the signal, the ECU 90 determines that the execution of the lane keeping support control is requested.

Forward Information Providing Device

The forward information providing device 24 is a device that provides information forward of the vehicle 100, and has at least one of a sensor such as a camera, a radar sensor (millimeter wave radar, and the like), an ultrasonic sensor (clearance sonar), and a laser radar (light detection and ranging (LiDAR)), and a road shape database such as a map database, for example.

The forward information providing device 24 is electrically connected to the ECU 90. The forward information providing device 24 provides information forward of the vehicle 100 (forward information) to the ECU 90. From the forward information, the ECU 90 acquires the curvature of the road on which the vehicle 100 is traveling, more specifically, the curvature of the road forward of the vehicle 100 (forward road curvature R). In particular, the ECU 90 acquires the curvature of a lane LN (see FIG. 2) in which the vehicle 100 is traveling, more specifically, the curvature of the lane LN forward of the vehicle 100, as the forward road curvature R.

For example, when the forward information providing device 24 has a camera, the forward information is information of an image in front of the vehicle 100 captured by the camera. In this case, the ECU 90 detects "a lane marking LM such as a white line provided on the road forward of the vehicle 100 (see FIG. 2)" from the information of the image, and acquires the forward road curvature R from the detected lane marking LM. Further, the ECU 90 detects, from the information of the image, at least one of objects that take a shape along the road shape, such as "the trajectory of another vehicle (preceding vehicle and/or vehicle alongside) traveling in front of the vehicle 100 on the same road as the road on which the vehicle 100 is traveling", "a guard rail GR installed on the road forward of the vehicle 100 (see FIG. 2)", and "an outer wall or a fence of a building BD on the side of the road forward of the vehicle 100 (see FIG. 2)", and acquires the forward road curvature R from the detected shape of the object.

When the forward information providing device 24 has a sensor, the forward information is object information such as "time from the time the sensor emits an electromagnetic wave or a sound wave to the time the sensor receives the reflected wave of the electromagnetic wave or the sound wave from the object" and "the direction in which the sensor receives the reflected wave of the electromagnetic wave or the sound wave". From the object information, the ECU 90 detects at least one of the objects that take a shape along the road shape, such as "the guard rail GR installed on the road forward of the vehicle 100 (see FIG. 2)", and "the outer wall or the fence of the building BD on the side of the road forward of the vehicle 100 (see FIG. 2)", and acquires the forward road curvature R from the detected shape of the object.

When the forward information providing device 24 has a road information database, the forward information is road information stored in the road information database. The ECU 90 acquires the shape of the road forward of the vehicle 100 from the road information and the current position of the vehicle 100, and acquires the forward road curvature R from the shape of the road.

GPS Device

The GPS device 25 is a device that receives so-called GPS signals. The GPS device 25 is electrically connected to the ECU 90. The GPS device 25 transmits the received GPS signal to the ECU 90. The ECU 90 acquires the current position of the vehicle 100 based on the GPS signal.

Alert Device

The alert device 26 is a device that issues an alert to the driver of the vehicle 100, and has, for example, at least one of a buzzer, a speaker, a lamp, a display, a vibration device, and the like. The alert device 26 is electrically connected to the ECU 90. When an alert condition Calert, which will be described later, is satisfied, the ECU 90 issues an alert to the driver by operating the alert device 26.

When the alert device 26 has a buzzer, the alert is an output of an alert sound from the buzzer. When the alert device 26 has a speaker, the alert is an output of voice (announcement) from the speaker. When the alert device 26 is a lamp, the alert is lighting of the lamp. When the alert device 26 is a display, the alert is an indication of an announcement image on the display. When the alert device 26 is a vibration device, the alert is the vibration of the steering wheel 31 or the driver's seat by the vibration device.

Outline of Operations of Vehicle Driving Support Device

Next, the outline of the operations of the vehicle driving support device 10 will be described. The vehicle driving support device 10 issues an alert to notify the driver of the vehicle 100 that the vehicle 100 is approaching a sharp curved road when the predetermined alert condition Calert is satisfied.

The vehicle driving support device 10 may issue an alert when the alert condition Calert is satisfied, in the case where the driver of the vehicle 100 requests issuance of an alert, or regardless of whether the driver of the vehicle 100 requests issuance of an alert, or regardless of whether the lane keeping support control is being executed. However, in this example, an alert is issued when the alert condition Calert is satisfied during the execution of the lane keeping support control.

Lane Keeping Support Control

The lane keeping support control is a control of acquiring a centerline LC of the lane LN in which the vehicle 100 is traveling (see FIG. 2) from the forward information, correcting the required steering force as necessary so that the vehicle 100 travels along the centerline LC, and providing the corrected required steering force to the vehicle 100, to cause the vehicle 100 to travel along the centerline LC of the lane LN. In other words, the lane keeping support control is a control for causing the vehicle 100 to travel along the lane LN.

When determining that the execution of the lane keeping support control is requested, the vehicle driving support device 10 starts the lane keeping support control, and when determining that the execution of the lane keeping support control is no longer requested, the vehicle driving support device 10 ends (stops) the lane keeping support control.

Alert

During execution of the lane keeping support control, the vehicle driving support device 10 acquires a forward road curvature R at a point that is a first distance D1 forward from the vehicle 100 (near point curvature Rn) and a forward road curvature R at a point that is a second distance D2 forward from the vehicle 100 (distant point curvature Rf). The second distance D2 is longer than the first distance D1.

The first distance D1 may be a predetermined fixed distance, but in this example, the first distance D1 is a distance that the vehicle 100 is predicted to travel from the present time to a time after a predetermined first time. Therefore, the first distance D1 becomes longer as the vehicle speed Vown of the vehicle 100 increases. The second distance D2 may be a predetermined fixed distance, but in this example, the second distance D2 is a distance that the vehicle 100 is predicted to travel from the present time to a time after a predetermined second time that is longer than the first time. Therefore, the second distance D2 also becomes longer as the vehicle speed Vown of the vehicle 100 increases.

Further, in this example, the near point curvature Rn is a curvature acquired from the forward information. That is, the near point curvature Rn is the forward road curvature R at the point that is the first distance D1 ahead of the vehicle 100. The distant point curvature Rf may also be a curvature acquired from the forward information, that is, the forward road curvature R at the point that is the second distance D2 ahead of the vehicle 100. However, in this example, the distant point curvature Rf is a curvature calculated by the following equation (1) using "a curvature Rnow of the lane LN at the point where the vehicle 100 is currently traveling", "a change rate Rrn of the near point curvature Rn per distance", and "the second distance D2".

$$Rf = Rnow + Rrn \times D2 \qquad (1)$$

When the distant point curvature Rf is larger than the near point curvature Rn and a difference between the curvatures (curvature difference ΔR) is equal to or larger than a predetermined value ΔRth, the vehicle driving support device 10 determines that the alert condition Calert is satisfied. In other words, the vehicle driving support device 10 determines that the alert condition Calert is satisfied when the distant point curvature Rf becomes larger than the near point curvature Rn by the predetermined value ΔRth or more.

In this example, the vehicle driving support device 10 determines that the alert condition Calert is satisfied when the distant point curvature Rf becomes larger than the near point curvature Rn by the predetermined value ΔRth or more regardless of whether the driver of the vehicle 100 is operating the steering wheel 31. However, the vehicle driving support device 10 may determine that the alert condition Calert is satisfied when the distant point curvature Rf becomes larger than the near point curvature Rn by the predetermined value ΔRth or more while the driver of the vehicle 100 is not operating the steering wheel 31.

When the vehicle driving support device 10 determines that the alert condition Calert is satisfied, the vehicle driving support device 10 issues an alert. That is, the vehicle driving support device 10 issues an alert, when the alert condition Calert that the distant point curvature Rf is larger than the near point curvature Rn by the predetermined value ΔRth or more is satisfied.

Further, the vehicle driving support device 10 may stop the alert when the alert condition Calert is no longer satisfied, but in this example, the alert is stopped when the alert condition Calert is no longer satisfied and an alert end condition Cend that an elapsed time T from the start of the alert has reached a predetermined time Tth is satisfied.

Figure 2:
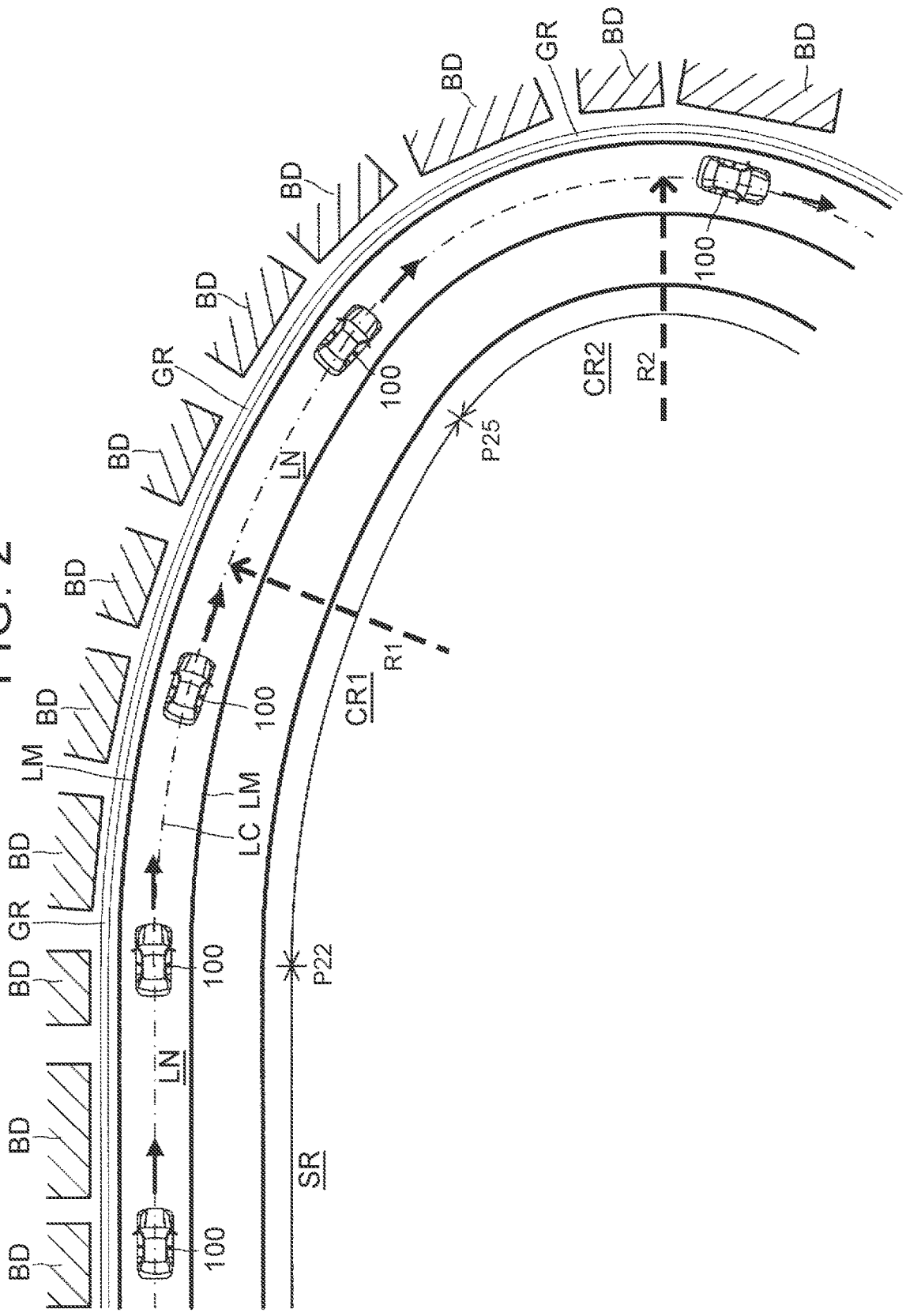

The operations of the vehicle driving support device 10 will be described with reference to FIGS. 2 and 3. In the example shown in FIG. 2, the road on which the vehicle 100 travels is a straight road SR with a curvature of the lane LN in which the vehicle 100 travels being zero up to a point P22. The road on which the vehicle 100 travels becomes a curved road CR1 with the curvature of the lane LN in which the vehicle 100 travels being a first curvature R1 at the point P22. Then, at a point P25, the road on which the vehicle 100 travels becomes a curved road CR2 with the curvature of the lane LN in which the vehicle 100 travels being a second curvature R2 that is larger than the first curvature R1.

Figure 3:
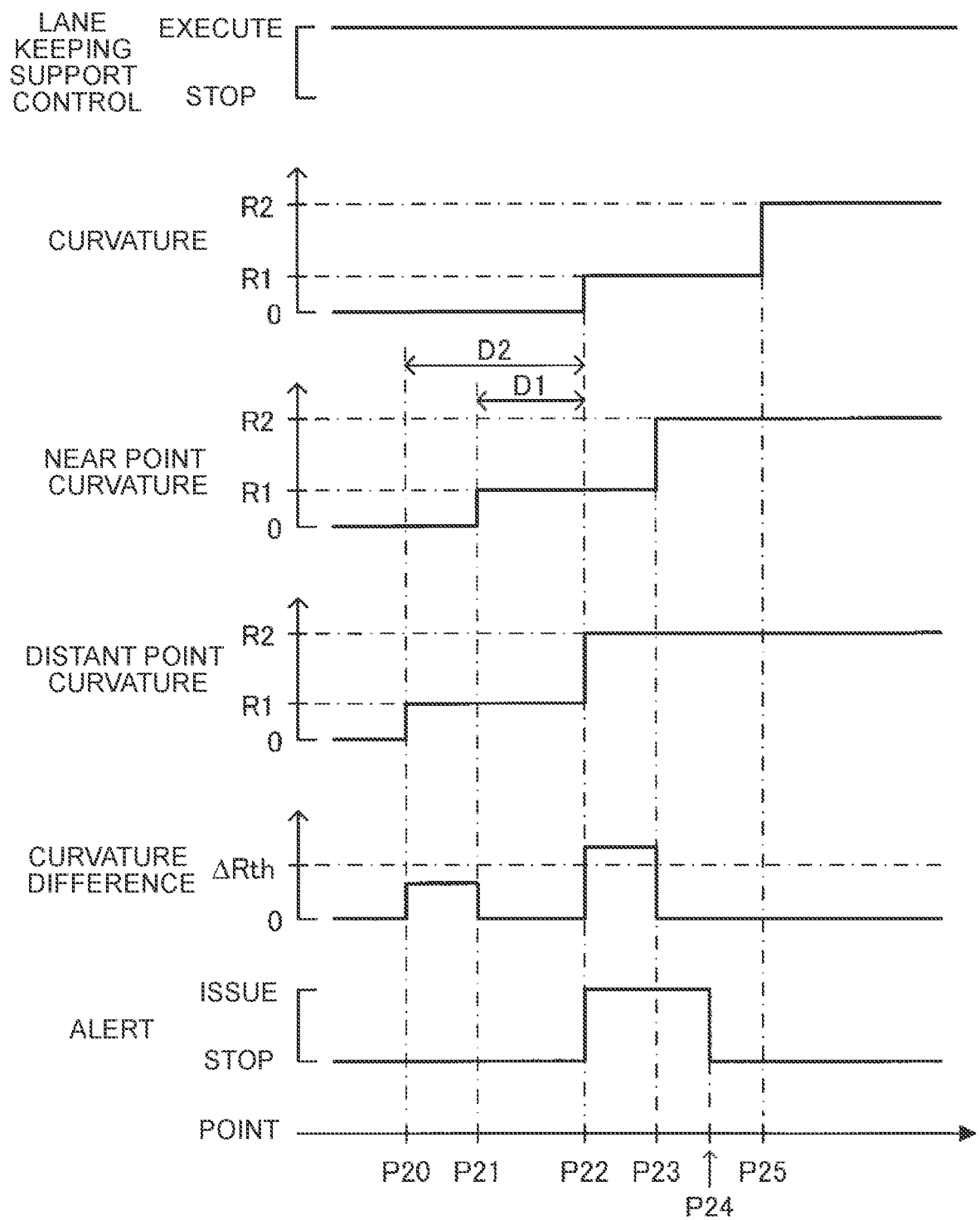
FIG. 3 is a time chart showing a near point curvature, a distant point curvature, and the like when the vehicle equipped with the vehicle driving support device according to the embodiment of the present disclosure travels on the road shown in FIG. 2.

As shown in FIG. 3, the near point curvature Rn acquired by the vehicle driving support device 10 is zero before the vehicle 100 reaches the point P21 that is the first distance D1 before the point P22 (the point where the straight road SR shifts to the curved road CR1). When the vehicle 100 reaches the point P21, the near point curvature Rn becomes the first curvature R1. Then, when the vehicle 100 reaches the point P23 that is the first distance D1 before the point P25 (the point where the curved road CR1 shifts to the curved road CR2), the near point curvature Rn becomes the second curvature R2.

Also, the distant point curvature Rf acquired by the vehicle driving support device 10 is zero before the vehicle 100 reaches the point P20 that is the second distance D2 before the point P22 (the point where the straight road SR shifts to the curved road CR1). When the vehicle 100 reaches the point P20, the distant point curvature Rf becomes the first curvature R1. Then, when the vehicle 100 reaches the point P22 that is the second distance D2 before the point P25 (the point where the curved road CR1 shifts to the curved road CR2), the distant point curvature Rf becomes the second curvature R2.

When the vehicle 100 travels as described above and the near point curvature Rn and the distant point curvature Rf are acquired, the curvature difference ΔR is zero until the vehicle 100 reaches the point P20, but once the vehicle 100 passes through the point P20, the curvature difference ΔR becomes the first curvature difference ΔR1. At this time, since the first curvature difference ΔR1 is smaller than the predetermined value ΔRth, no alert is issued.

After that, the curvature difference ΔR becomes zero when the vehicle 100 reaches the point P21. Thereafter, the curvature difference ΔR becomes the second curvature difference ΔR2 when the vehicle 100 reaches the point P22. At this time, since the second curvature difference ΔR2 is equal to or larger than the predetermined value ΔRth, the alert is started. After that, the alert is continued as long as the curvature difference ΔR is equal to or larger than the second curvature difference ΔR2.

In this example, the curvature difference ΔR becomes zero when the vehicle 100 reaches the point P23. At this point, the alert condition Calert is no longer satisfied, but the alert is continued because the elapsed time T from the start of the alert is shorter than the predetermined time Tth. After that, when the vehicle 100 reaches a point P24, the elapsed time T from the start of the alert reaches the predetermined time Tth and the alert end condition Cend is satisfied, so that the alert is ended.

Effects

The vehicle driving support device 10 uses the curvature of the road at the point that is the first distance D1 ahead of the point where the vehicle 100 is currently traveling (near point curvature Rn) and the curvature of the road at the point that is the second distance D2 ahead of the point where the vehicle 100 is currently traveling (distant point curvature Rf), rather than the curvature of the road at the point where the vehicle 100 is currently traveling, in order to determine whether to issue an alert. Therefore, the driver recognizes the alert as an alert that is not for the driver's current operation on the steering wheel 31, but for the operation on the steering wheel 31 that will be required in the future. Thus, it is possible to notify the driver in advance and without discomfort that the vehicle 100 is approaching a road having a large curvature.

In the above example, the alert condition Calert is a condition that the distant point curvature Rf is larger than the near point curvature Rn by the predetermined value ΔRth or more. However, the alert condition Calert may be a condition that the distant point curvature Rf is larger than the near point curvature Rn by the predetermined value ΔRth or more and the distant point curvature Rf is equal to or larger than a predetermined distant point curvature Rf_th. Alternatively, the alert condition Calert may be a condition that the distant point curvature Rf is larger than the near point curvature Rn by the predetermined value ΔRth or more and the near point curvature Rn is equal to or larger than a predetermined near point curvature Rn_th. Alternatively, the alert condition Calert may be a condition that the distant point curvature Rf is larger than the near point curvature Rn by the predetermined value ΔRth or more, the distant point curvature Rf is equal to or larger than the predetermined distant point curvature Rf_th, and the near point curvature Rn is equal to or larger than the predetermined near point curvature Rn_th.

Further, the vehicle driving support device 10 stops the alert when the alert condition Calert is no longer satisfied after the start of the alert and the alert end condition Cend that the elapsed time T from the start of the alert has reached the predetermined time Tth is satisfied. However, the vehicle driving support device 10 may be configured to continue the alert until the vehicle 100 approaches a road having the curvature difference ΔR of a predetermined value ΔRth or more (road that is the target for the alert) after the start of the alert.

Specific Operations of Vehicle Driving Support Device

Figure 4:
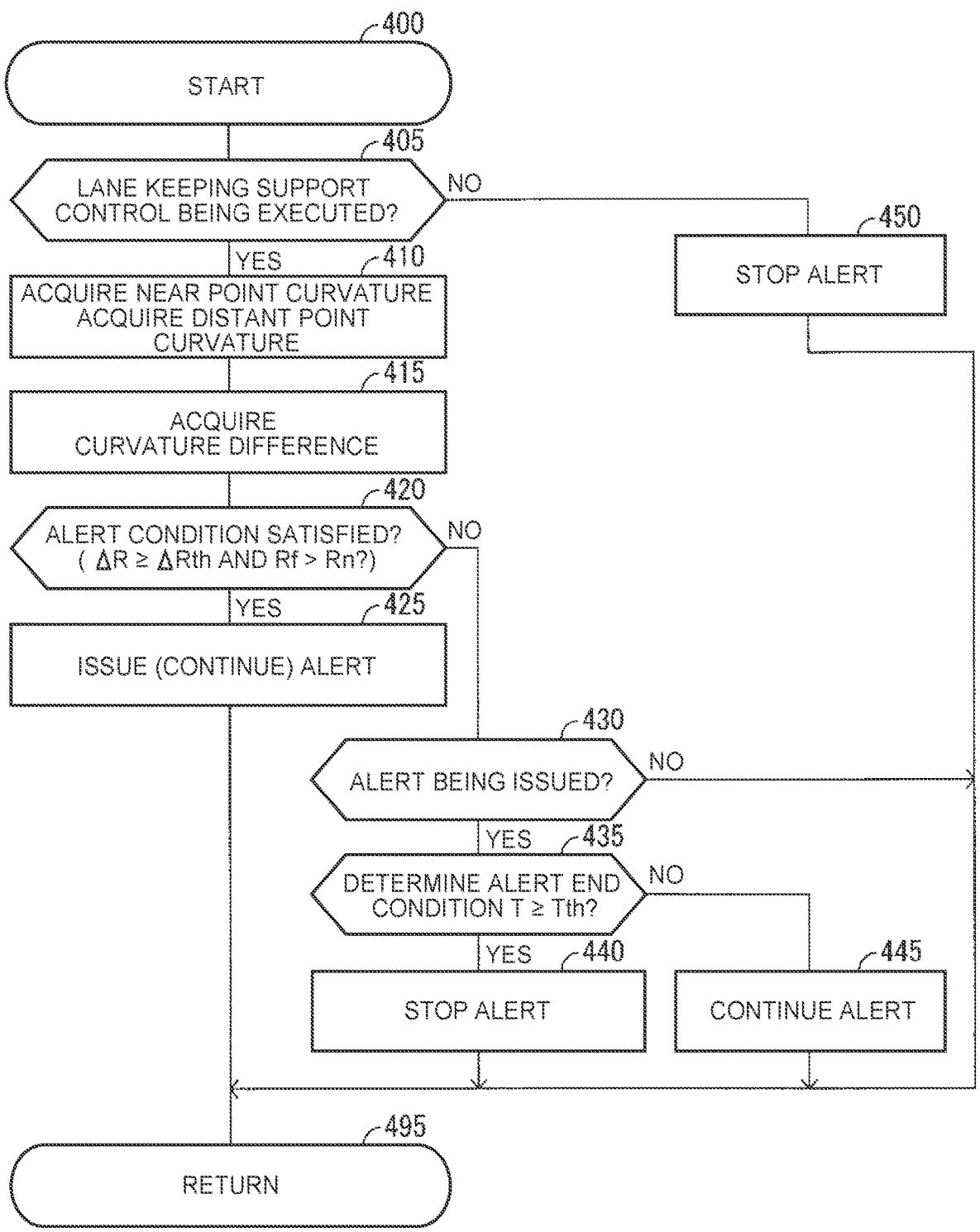
FIG. 4 is a flowchart showing a routine executed by the vehicle driving support device according to the embodiment of the present disclosure.

Next, the specific operations of the vehicle driving support device 10 will be described. The CPU of the ECU 90 of the vehicle driving support device 10 executes the routine shown in FIG. 4 every time a predetermined calculation time has elapsed. Thus, at a predetermined timing, the CPU starts the process from step 400 in FIG. 4, advances the process to step 405, and determines whether the lane keeping support control is being executed.

When the CPU determines "Yes" in step 405, the CPU advances the process to step 410 and acquires the near point curvature Rn and the distant point curvature Rf. Next, the CPU advances the process to step 415 and acquires the difference between the near point curvature Rn and the distant point curvature Rf acquired in step 410 (curvature difference ΔR). Next, the CPU advances the process to step 420 and determines whether the alert condition Calert is satisfied. Specifically, the CPU determines whether the curvature difference ΔR acquired in step 415 is equal to or larger than the predetermined value ΔRth and the distant point curvature Rf acquired in step 410 is larger than the near point curvature Rn acquired in step 410.

When the CPU determines "Yes" in step 420, the CPU advances the process to step 425. The CPU starts the alert when the alert is not being issued and continues the alert when the alert is being issued. Thereafter, the CPU advances the process to step 495 and temporarily ends the routine.

When the CPU determines "No" in step 420, the CPU advances the process to step 430 and determines whether the alert is being issued.

When the CPU determines "Yes" in step 430, the CPU advances the process to step 435 and determines whether the elapsed time T from the start of the alert is equal to or more than the predetermined time Tth.

When the CPU determines "Yes" in step 435, the CPU advances the process to step 440 and stops the alert. Thereafter, the CPU advances the process to step 495 and temporarily ends the routine.

When the CPU determines "No" in step 435, the CPU advances the process to step 445 and continues the alert. Thereafter, the CPU advances the process to step 495 and temporarily ends the routine.

When the CPU determines "No" in step 430, the CPU directly advances the process to step 495 and temporarily ends the routine.

When the CPU determines "No" in step 405, the CPU advances the process to step 450. The CPU stops the alert when the alert is being issued, and when the alert is not being issued, the CPU maintains the state in which the alert is not being issued. Thereafter, the CPU advances the process to step 495 and temporarily ends the routine.

The above is the specific operations of the vehicle driving support device 10.

Note that the present disclosure is not limited to the above embodiment, and various modifications can be adopted within the scope of the present disclosure.

Modifications

For example, when the driver is operating the steering wheel 31 by themselves when the alert condition Calert is satisfied, the driver must steer the vehicle 100 by themselves such that the vehicle 100 travels along the lane LN when the vehicle 100 approaches a sharp curved road. In this case, issuing an alert may make the driver feel annoyed. In contrast, if the driver is not operating the steering wheel 31 while looking aside, taking a nap, or taking their hands off the steering wheel 31, the alert is useful to the driver.

The vehicle driving support device 10 described above issues an alert regardless of whether the driver is operating the steering wheel 31 when the alert condition Calert is satisfied. However, the vehicle driving support device 10 may be configured to determine whether to issue an alert depending on whether the driver is operating the steering wheel 31 when the alert condition Calert is satisfied.

Specifically, the vehicle driving support device 10 according to the modification of the embodiment of the present disclosure determines whether a steering wheel operation condition Csteer that the driver is operating the steering wheel 31 (namely, steering wheel operation condition Csteer that the steering wheel operation of the driver is detected) is satisfied, when the alert condition Calert is satisfied.

The vehicle driving support device 10 issues an alert when the steering wheel operation condition Csteer is not satisfied. The vehicle driving support device 10 does not issue an alert when the steering wheel operation condition Csteer is satisfied. Therefore, the alert condition Calert according to the modification includes a condition that the distant point curvature Rf is larger than the near point curvature Rn by the predetermined value ΔRth or more and a condition that the driver's steering wheel operation is not detected.

Alternatively, when the steering wheel operation condition Csteer is not satisfied, the vehicle driving support device 10 issues an alert in a form with a high possibility of being noticed by the driver. In other words, the vehicle driving support device 10 issues an alert with a high alert level. For example, when the vehicle driving support device 10 issues an alert by outputting an alert sound from the buzzer, the vehicle driving support device 10 issues an alert with a high alert level by outputting the alert sound from the buzzer at a relatively high volume. When the steering wheel operation condition Csteer is satisfied, the vehicle driving support device 10 issues an alert in a form with a relatively low possibility of being noticed by the driver. In other words, the vehicle driving support device 10 issues an alert with a low alert level. For example, when the vehicle driving support device 10 issues an alert by outputting an alert sound from the buzzer, the vehicle driving support device 10 issues an alert with a low alert level by outputting the alert sound from the buzzer at a relatively low volume. As described above, the vehicle driving support device 10 may set the alert level to be lower when the steering wheel operation by the driver is detected than when the steering wheel operation by the driver is not detected.

Figure 5:
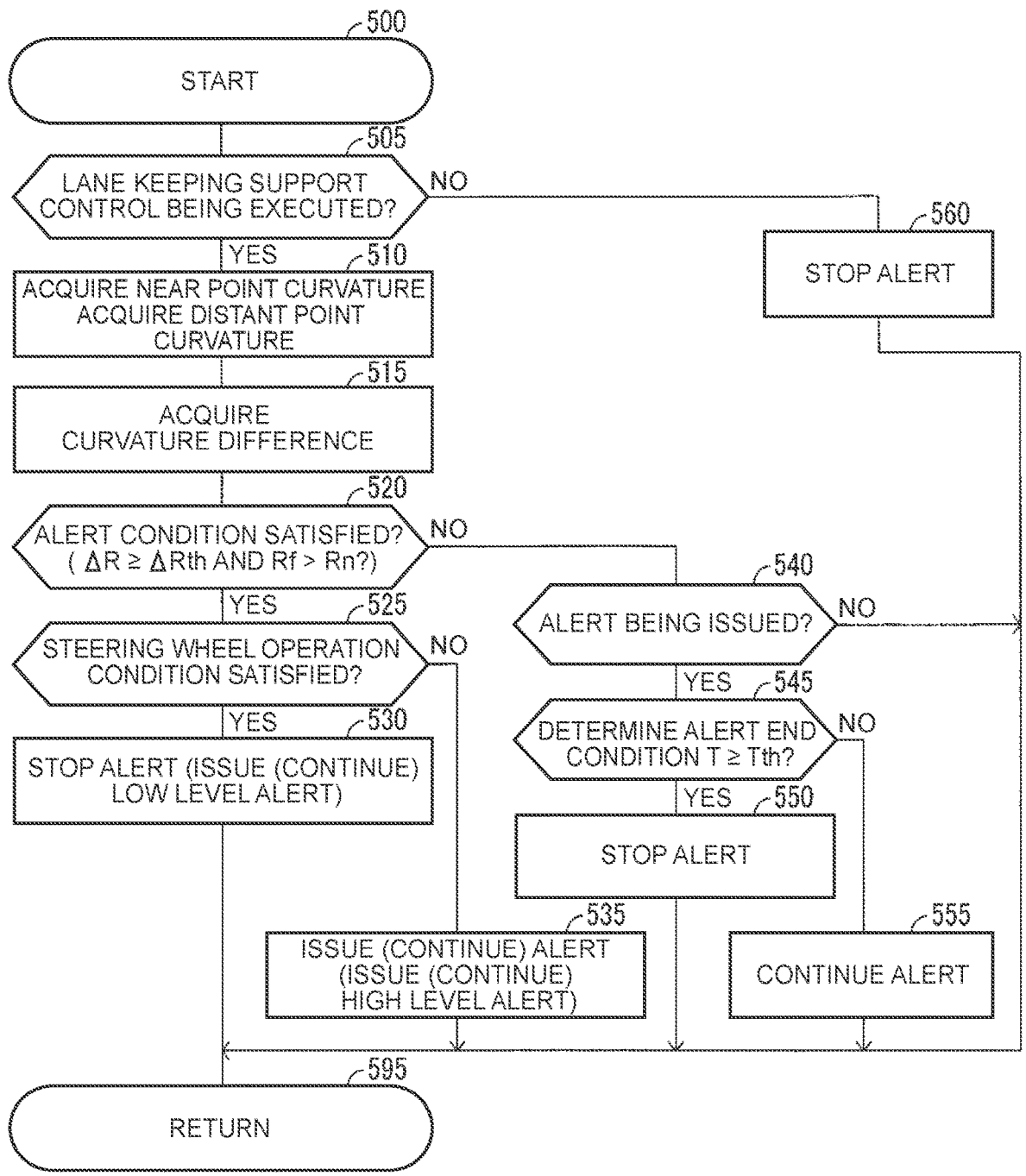
FIG. 5 is a flowchart showing a routine executed by the vehicle driving support device according to a modification of the embodiment of the present disclosure.

Next, the specific operations of the vehicle driving support device 10 according to the modification will be described. The CPU of the ECU 90 of the vehicle driving support device 10 according to the modification executes the routine shown in FIG. 5 every time a predetermined calculation time has elapsed. Thus, at a predetermined timing, the CPU starts the process from step 500 in FIG. 5, advances the process to step 505, and determines whether the lane keeping support control is being executed.

When the CPU determines "Yes" in step 505, the CPU advances the process to step 510 and acquires the near point curvature Rn and the distant point curvature Rf. Next, the CPU advances the process to step 515 and acquires the difference between the near point curvature Rn and the distant point curvature Rf acquired in step 510 (curvature difference ΔR). Next, the CPU advances the process to step 520 and determines whether the alert condition Calert is satisfied. Specifically, the CPU determines whether the curvature difference ΔR acquired in step 515 is equal to or larger than the predetermined value ΔRth and the distant point curvature Rf acquired in step 510 is larger than the near point curvature Rn acquired in step 510.

When the CPU determines "Yes" in step 520, the CPU advances the process to step 525 and determines whether the steering wheel operation condition Csteer is satisfied.

When the CPU determines "Yes" in step 525, the CPU advances the process to step 530. The CPU stops the alert when the alert is being issued, and when the alert is not being issued, the CPU maintains the state in which the alert is not being issued. Alternatively, the CPU starts the alert with a low alert level when the alert with a low alert level is not being issued, and continues the alert with a low alert level when the alert with a low alert level is being issued. Thereafter, the CPU advances the process to step 595 and temporarily ends the routine.

When the CPU determines "No" in step 525, the CPU advances the process to step 535. The CPU starts the alert when the alert is not being issued and continues the alert when the alert is being issued. Thereafter, the CPU advances the process to step 595 and temporarily ends the routine.

When the CPU determines "No" in step 520, the CPU advances the process to step 540 and determines whether the alert is being issued.

When the CPU determines "Yes" in step 540, the CPU advances the process to step 545 and determines whether the elapsed time T from the start of the alert is equal to or more than the predetermined time Tth.

When the CPU determines "Yes" in step 545, the CPU advances the process to step 550 and stops the alert. Thereafter, the CPU advances the process to step 595 and temporarily ends the routine.

When the CPU determines "No" in step 545, the CPU advances the process to step 555 and continues the alert. Thereafter, the CPU advances the process to step 595 and temporarily ends the routine.

When the CPU determines "No" in step 540, the CPU directly advances the process to step 595 and temporarily ends the routine.

When the CPU determines "No" in step 505, the CPU advances the process to step 560. The CPU stops the alert when the alert is being issued, and when the alert is not being issued, the CPU maintains the state in which the alert is not being issued. Thereafter, the CPU advances the process to step 595 and temporarily ends the routine.

The above is the specific operations of the vehicle driving support device 10 according to the modification.

What is claimed is:

1. A vehicle driving support device, comprising:
    an electronic control unit configured to issue an alert to notify a driver of a vehicle in advance that the vehicle is approaching a road having a large curvature; and
    a forward information providing device that provides, to the electronic control unit, forward information that includes information indicating a curvature of the road forward of the vehicle, wherein the forward information providing device is a camera installed in the vehicle that provides an image information as the forward information the image information obtained by the camera capturing images forward of the vehicle, wherein the electronic control unit is configured to:
    detect, from the image information, an outer wall or a fence of a building on a side of the road forward of the vehicle, and acquire a forward road curvature from the shape of the detected outer wall or fence as the forward information;
    determine, from the forward information, a near point curvature of a near point that is a first distance forward from the vehicle and a distant point curvature of a distant point that is a second distance forward from the vehicle, the second distance being longer than the first distance; detect a vehicle speed of the vehicle, wherein both the first distance and the second distance increase as the vehicle speed of the vehicle increases;
    issue the alert for turning of a steering wheel when an alert condition is satisfied that the distant point curvature is larger than the near point curvature by a predetermined value or more; and
    set a level of the alert to be lower when the turning of the steering wheel by the driver is detected than when the turning of the steering wheel by the driver is not detected.

2. The vehicle driving support device according to claim 1, wherein the alert condition includes a condition that a steering wheel operation by the driver is not detected.

3. The vehicle driving support device according to claim 1, wherein the alert condition includes a condition that the distant point curvature is equal to or larger than a predetermined distant point curvature.

4. The vehicle driving support device according to claim 1, wherein the alert condition includes a condition that the near point curvature is equal to or larger than a predetermined near point curvature.

5. The vehicle driving support device according to claim 1, wherein
    the vehicle driving support device acquires the near point curvature and the distant point curvature during execution of a lane keeping support control, and
    the lane keeping support control acquires a centerline of a lane in which the vehicle is travelling from the forward information, corrects a required steering force and provides the corrected required steering force so that the vehicle travels along the lane.

6. The vehicle driving support device according to claim 1, wherein the alert is stopped when the alert condition is no longer satisfied and an alert end condition that an elapsed time from a start of the alert has reached a predetermined time is satisfied.

7. The vehicle driving support device according to claim 1, wherein the driver is driving the vehicle when the alert condition is satisfied.

8. The vehicle driving support device according to claim 1, wherein the alert is issued when the turning of the steering wheel by the driver is detected.

9. The vehicle driving support device according to claim 1, wherein the near point curvature and the distant point curvature are curvatures in a same curved road that curves in the same direction.

* * * * *